Patented Feb. 7, 1950

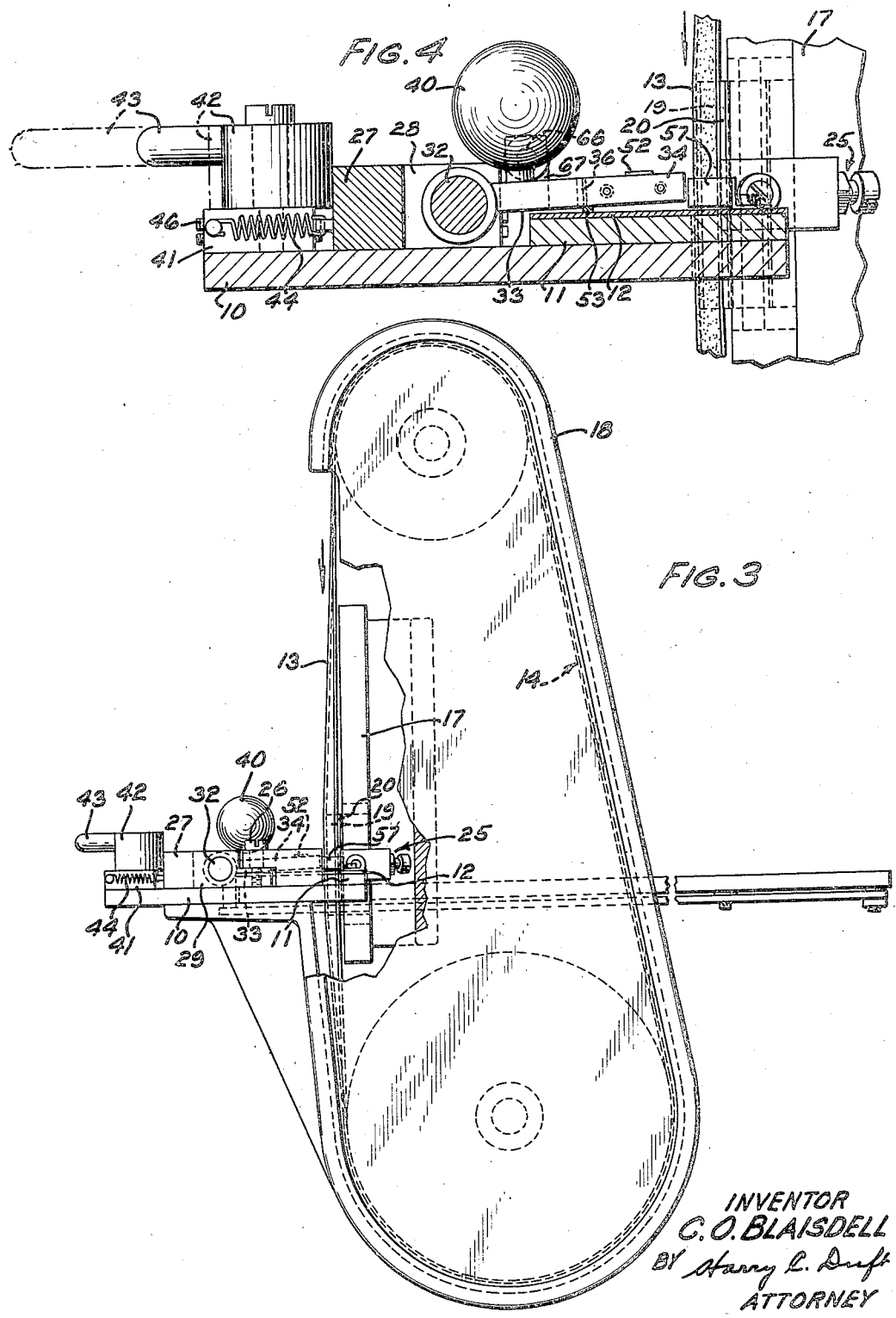

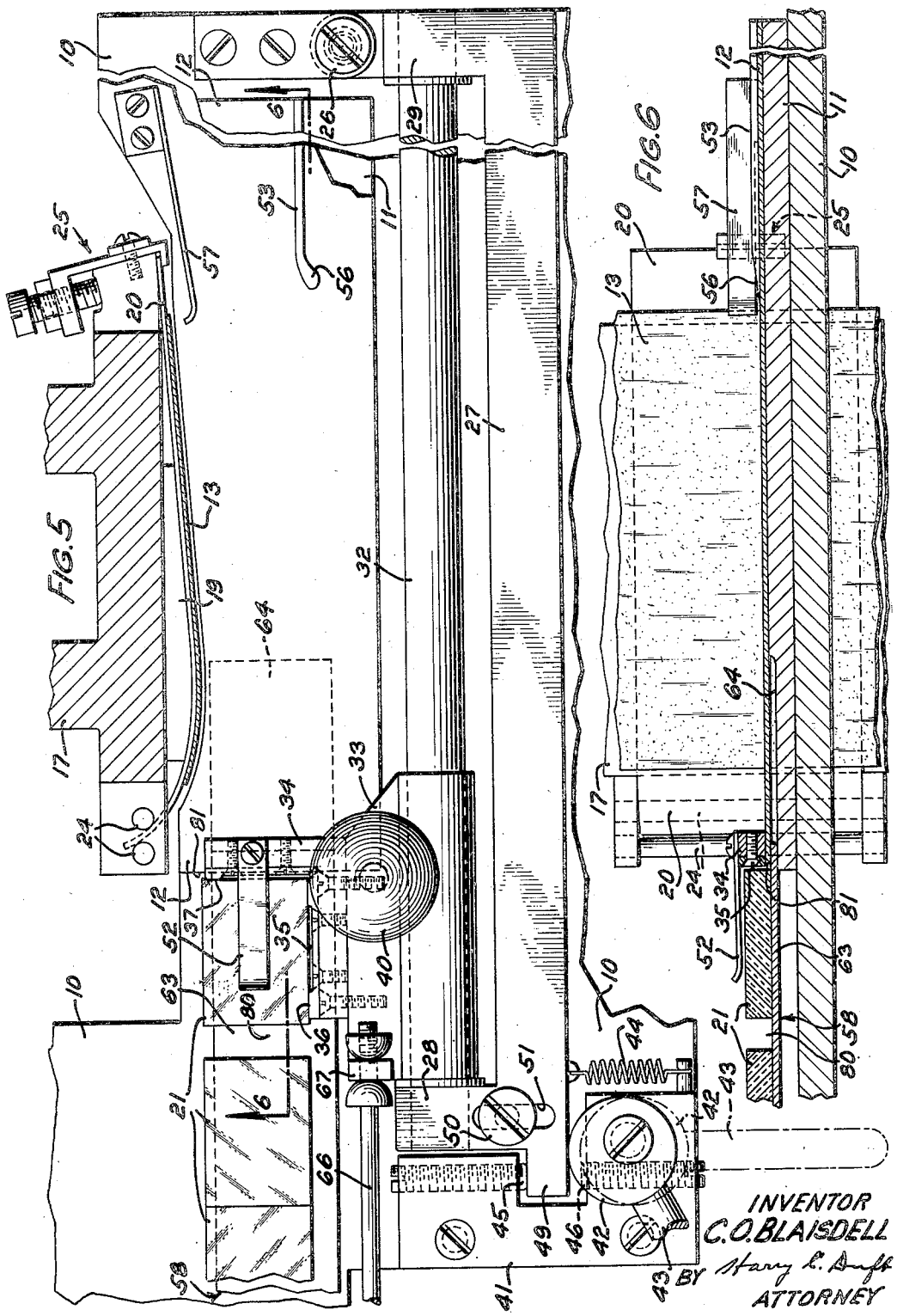

2,496,929

UNITED STATES PATENT OFFICE 2,496,929

ARTICLE FORMING APPARATUS

Charles O. Blaisdell, Oak Park, Ill., assignor to Western Electric Company, Incorporated, New York, N. Y., a corporation of New York Application August 31, 1945, Serial No. 613,775

6 Claims. (Cl. 51—137)

This invention relates to article forming apparatus and more particularly to an article abrading apparatus wherein an article is advanced across and into engagement with an abrading element having an abrasive surface moving perpendicular to the direction of article feed.

The invention is particularly useful in feeding articles, such as ammonium dihydrogen phosphate crystals, into engagement with an abrading element to abrade them to predetermined dimensions between parallel edge faces thereof. Heretofore, it has been difficult to uniformly abrade such crystals to close dimensional tolerances in an efficient manner and without deleterious shock thereto, which, at times, results in fracture and breakage, due to the fragile nature of the article.

One object of this invention is to provide an apparatus for obtaining more accurate and more flawless shaping of crystals.

A further object is to provide a simple, efficient and practicable apparatus for forming articles by abrasion employing an abrading element having an abrasive surface moving perpendicular to the direction of article feed.

In accordance with the above objects, the present invention, in one embodiment thereof, as applied to an article abrading apparatus employing a vertically moving endless sanding belt, comprises a bowed backing plate for correspondingly guiding, in a transverse direction, a downwardly moving length of the belt, a horizontal plate upon which the article is placed and advanced transversely of the belt for abrading the same, and an article carrier slidable upon the article supporting plate for thus advancing the article, which is seated upon two of its angularly disposed edge faces, against angularly disposed faces of the carrier. The carrier is guided during its advance on a frame resting on the article supporting plate, the frame being adjustable about a vertical axis to various angles perpendicular to the direction of travel of the downwardly moving bowed belt length, whereby the article may be advanced horizontally across the belt length at different angles to vary the depth of the material removed from the edge face of the article.

Other objects and advantages of this invention will more fully appear from the following detailed description, taken in conjunction with the accompanying drawings, in which Fig. 1 is a fragmentary plan view, partly in section, of an apparatus embodying the features of the invention, the apparatus being shown in its normal position with a crystal in its initial position thereon in preparation for sanding;

Fig. 3 is a fragmentary end view, partly in section, looking toward the right end of Fig. 1;

Fig. 4 is an enlarged vertical section taken on the line 4—4 of Fig. 1;

Fig. 5 is an enlarged view of a portion of Fig. 1, the apparatus being shown after an operation of sanding the crystal shown mounted in its initial position at the right end of Fig. 1; and Fig. 6 is a vertical cross section taken on the line 6—6 of Fig. 5.

Figure 1:
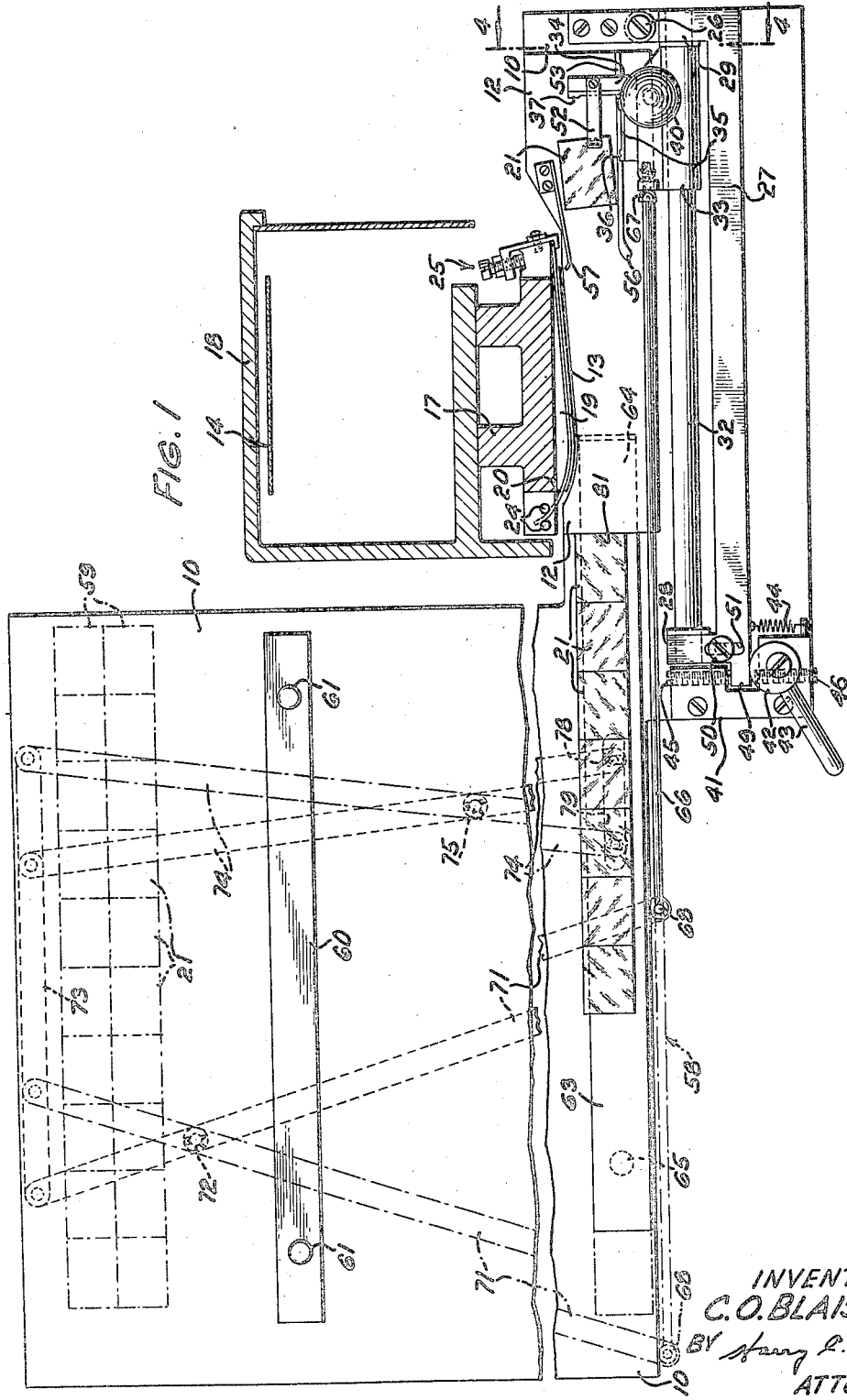
Figure 2:
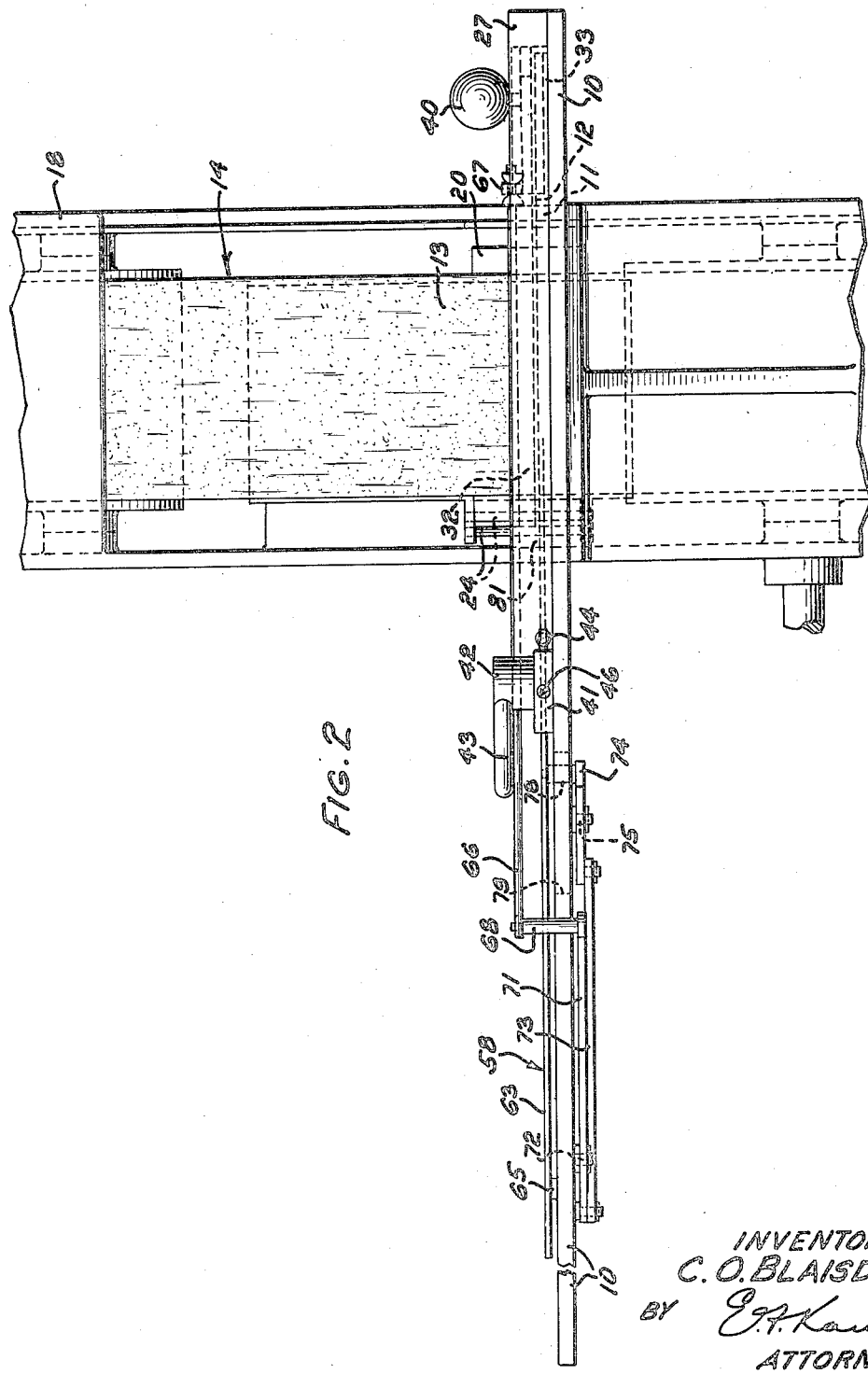
Fig. 2 is a fragmentary front elevation of Fig. 1.

Referring to the drawings, particularly to Figs. 1, 5 and 6, the numeral 10 indicates a main irregularly shaped base plate for supporting the article feeding apparatus. Secured to the upper face of the plate 10 at its right side, as viewed in Fig. 4, is a plate 11, to which is fixed an upper face plate 12 of hardened steel. The rear or upper edge of the plate 10 (Fig. 5), as well as the corresponding edges of the plates 11 and 12, are suitably shaped so that a downwardly moving run or length 13 of a motor driven endless sanding belt 14 will lie adjacent such edges of the plates. Secured to a member 17 of a supporting framework and housing 18 for the belt 14 and its driving mechanism is a bowed plate 19, against which is clamped a relatively thin hardened steel strip 20 for backing the downwardly moving belt length 13 and providing the transversely bowed shape thereto, shown in Figs. 1 and 5, and across which bowed belt length, articles, such as ammonium dihydrogen phosphate crystals 21 are transversely fed in the sanding of its side edges to provide crystals of predetermined dimensions. One end of the strip 20 is inserted between a pair of fixed pins 24 and its opposite end is clamped against a vertical face of the member 17 by a screw clamp, indicated in general at 25.

Pivoted about a vertical axis, as indicated at 26 (Figs. 1, 3 and 5), to the plate 10 is an irregularly shaped elongated frame 27 freely bearing at its lower face on the upper face of the plate 10. Fixed at opposite ends in arms 28 and 29 of the frame 27 is a stud shaft 32, upon which is slidably and pivotally mounted a carrier 33 (Fig. 5) supporting an L-shaped member 34, in turn supporting a similarly shaped removable crystal seating member 35. The member 35 is formed with vertical faces 36 and 37 disposed at right angles to each other, which are relieved, and against which two vertical faces of the crystal 21 are seated during the sanding operation.

During a sanding operation, that is, when one of the longitudinal vertical faces, for example, of the crystal 21 is enagged with and being moved transversely across the belt length 13, the lower faces of the L-shaped members 34 and 35 and that of the crystal 21 are bearing upon the upper face of the face plate 12. Attached to the carrier 33 is a ball-shaped handle 40, by means of which an operator may manipulate the carrier during the sanding operation and, for returning it to its normal position, as shown in Figs. 1 and 4. In moving the carriage 33 towards the left (Fig. 1) during a sanding operation, the arm 28 of the frame 27 serves as a stop for the carriage, as shown in Fig. 5. Fixed to the plate 10 adjacent the left end of the pivotal frame 27 is an irregularly shaped member 41, on which is journalled a cam 42 having a handle 43 for manipulating it, the periphery of the cam constantly bearing on a forward vertical face of the pivotal frame 27. A tension spring 44, having its opposite ends attached to the fixed member 41 and to the pivotal frame 27, serves to maintain the frame in engagement with the periphery of the cam 42 at all times. Adjustable stop screws 45 and 46, carried in the fixed member 41 and arranged at opposite sides of and in the path of an arm 49 of the pivotal frame 27 serve to limit movements of the frame in either direction about its pivot 26 during the operation of sanding the crystal 21. For the purpose of clamping the frame 27 in a set position, as desired, a set screw 50 is provided, the screw being threaded into the plate 10 and extending through a slot 51 in the frame.

Secured to the carrier 33 is a leaf spring 52, which, during the engagement of the crystal 21 with the sanding belt length 13, after the crystal is seated against the vertical faces 36 and 37 of the carrier, bears down upon the crystal to maintain it in its seated position. Fixed to the upper face of the face plate 12 at the right end thereof (Figs. 1, 5 and 6) is a member 53, which is tapered at its left end and slightly curved away from the sanding belt length 13, as indicated at 56. The member 53 serves as a rest for the slidable and pivotal carriage 33, when it is in its normal position (Figs. 1 and 4). In such position, the carriage will be slightly elevated at its right end, as shown in Fig. 4, thus positioning the leaf spring 52 carried thereon so that it will not bear upon the fragile crystal 21 until the carriage 33 rides off the rest member 53 when the carriage is slid towards the left from its normal position (Fig. 1). When this former position of the carriage 33 is reached, the crystal 21, which has been positioned upon the face plate 12 approximately in the position shown in Fig. 1, will have been engaged at its adjacent short face by the vertical face 37 of the carriage 33 and a longitudinal face, which is to be abraded, of the crystal by a leaf spring 57 fixed to the face plate 12. It will be readily apparent that, as the advancing carriage face 37 engages the crystal 21, the latter will be advanced into engagement with the leaf spring 57 and the arrangement and action of the cooperating parts are such that two angular faces of the crystal will be completely seated against the carriage faces 36 and 37 by the time the inclined carriage 33 rides off the rest member 53, at which instant the leaf spring 52 bears down upon the crystal and thus retains it in its seated position in its continued advance transversely across the sanding belt length 13.

At the left end of the pivotal frame 27 (Figs. 1, 5 and 6) is a mechanism, indicated in general at 58, which is operatively connected to the carrier 33, for automatically receiving the crystals 21 one by one, as they are abraded, from the face plate 12 and advancing them without deleterious shock thereto until a predetermined number of abraded crystals have been arranged in train formation, whereupon they may be manually slid, without the operator contacting them, as a group 59 from the mechanism 58 by a hand tool 60, provided with handles 61, onto the plate 10. A reciprocatory plate 63, arranged in the line of travel of the crystal (Figs. 1 and 5) is freely slidable at its right end (Fig. 6) on a depressed surface 64 of the plate 11, its upper face being in the plane of the lower face of the plate 12. At its left end, the plate 63 is slidable on a raised portion 65 of the plate 10. The plate 63 is reciprocated during the operative and return movements of the carrier 33, but at a reduced speed, for a purpose to be described hereinafter, by a link and lever mechanism. This latter mechanism comprises a link 66 pivotally connected at opposite ends, as indicated at 67 and 68, to the carriage 33 and a lever 71 pivoted at 72 to the bottom face of the plate 10. A short end of the lever 71 is pivotally connected to one end of a link 73, having its opposite end similarly connected to a long end of a lever 74 pivoted at 75 to the bottom face of the plate 10. A short end of the lever 74 is pivotally connected by a pin 78 to the plate 63, the pin extending freely through a clearance slot 79 formed in the plate 10.

Thus, as the carriage 33 is advanced to the left to the position shown in Figs. 5 and 6, the abraded crystal 21 is slid off the face plate 12 and onto a vacant portion of the reciprocatory plate 63, which is being similarly advanced but at a reduced speed by the described link and lever mechanism. During this advance of the plate 63, the crystal 21 previously deposited on the plate 63 is advanced a distance greater than its length, as indicated by a space 80 between the crystals 21 (Fig. 6), which provides a vacant portion on the plate for receiving the next crystal, which is slid off the face plate 12 and onto the plate 63 without engaging the adjacent crystal. Since the upper face of the plate 63 is in the plane of the lower face of the plate 12, an end vertical edge face 81 of the latter plate provides an abutment for the crystal 21 last deposited on the plate 63, which is subsequently abutted by the adjacent spaced crystal 21 on the plate 63 when the latter plate is moved to the right during the return of the carrier 33 to its normal position (Fig. 1). The reduced speed of the plate 63 relative to the speed at which the carriage 33 may be operated eliminates all deleterious shock between the fragile crystals 21 on the plate 63 in movements of the carriage in either direction when the space 80 is closed by the abutting of the crystals. When the plate 63 is completely filled with a train of abraded crystals 21, they may be readily removed therefrom without the operator contacting them as a group by engaging a longitudinal edge face of the hand tool 60 therewith and sliding them upward, as viewed in Fig. 1, onto the plate 10.

In using the apparatus above described for feeding the referred-to type of crystals 21 transversely of and into engagement with the downwardly moving sanding belt length 13 and assuming that, in the manner previously described, the carriage supporting frame 27 has been adjusted about its axis 26 by means of the cam 42 and is retained thereat by the set screw 50 for the final abrading operation on one of its longitudinal edge faces and that the carriage 33 is in its normal retracted position, a crystal 21 is placed on the face plate 12, as shown in Fig. 1. The operator grasps the handle 40 and slides the carriage 33 pivoted on the stud shaft 32 to the position shown in Fig. 5, during which movement the crystal 21 is first automatically seated against the carriage faces 36 and 37 and then retained in such position on the face plate 12 by the leaf spring 52 and finally advanced transversely across the face of the sanding belt length 13 and deposited on the slower moving reciprocatory plate 63 in the position shown in Figs. 5 and 6. The operator then deposits another crystal 21 to be abraded on the face plate 12 at the position shown in Fig. 1. Thereafter, the operator grasps the handle 40 of the pivotal carriage 33 and rocks it about the shaft 32 slightly counterclockwise, as viewed in Fig. 4, and at the same time sliding it on the shaft 32 to its normal operative position, shown in Fig. 1, whereupon it is allowed to move clockwise to rest upon the member 53 (Fig. 4), thus completing a cycle of operation of the carriage 33 for abrading one longitudinal face of the crystal 21.

In the above description of operation of the apparatus, it is assumed that the longitudinal edge face of the crystal 21 opposite to the edge face which has just been abraded was abraded in a previous operation when the pivotal frame 27 had a different setting than that shown in the drawings. The crystals 21 may be received for abrading with their opposite edges marred or nicked and to abrade them to predetermined dimensions, it may be necessary to remove more material from one edge face than the other in one or more operations and, in some cases, from only one edge face in order to provide smooth unmarred parallel edge faces predeterminedly spaced from each other. To effect another setting of the frame 27 from that shown in the drawings, the set screw 50 is released and the cam 42, for example, is rotated to its broken outline position or to some point intermediate the full and broken outline position thereof (Fig. 5), depending on the depth of material to be removed. This movement of the cam permits the frame to rotate counterclockwise about its pivot 26 (Fig. 5) under the action of the spring 44 and then is clamped by the set screw 50. In this latter position of the frame 27, the operation of the apparatus is similar to the operation previously described, but the approach of the crystal 21 to and transversely across the sanding belt length 13 will be at a slight angle to that shown in the drawings.

What is claimed is:

1. In an apparatus for forming articles by abrasion, an abrading element, a stationary support upon which an article is deposited, a slideway carried by said support, a member reciprocatable and pivotal on said slideway and normally bearing on said support for feeding an article across said support, means on said support for initially supporting said member in spaced relation with said support during its advance until the article is predeterminedly positioned relative thereto, resilient means arranged on said support and in the path of the article for moving and seating it against said member previous to the engagement of the article with said element, means on said member effective after the seating of the article for maintaining the article seated on said support and against said member during its abrading, means for moving said element in a path approximately perpendicular to the path of movement of an article across said support, and means engaging a portion of said element to deflect it into the path of the article while maintaining it perpendicular to the path of the article so that the article approaches said portion at an angle thereto.

2. In an apparatus for forming articles by abrasion, abrading means, a stationary support upon which an article is deposited, reciprocatory means for feeding articles past said abrading means, a reciprocatory plate extending from one end edge of and arranged below the plane of said support for receiving abraded articles therefrom during feeding movements of said reciprocatory article feeding means, and means actuated by said reciprocatory article feeding means for driving said reciprocatory article receiving plate at a lower rate of speed than the speed of said reciprocatory article feeding means, said one end edge of said support being effective to limit the reverse movement of articles on said reciprocatory article receiving means when said latter means is reciprocated in a reverse direction.

3. In an apparatus for forming articles by abrasion, an abrading element, a stationary support upon which an article is deposited, an article carrying member mounted for movement across said support and having angularly arranged faces against which the article is seated for feeding the same across said support, resilient means arranged on said support and in the path of the article initially engaged by one of said angular faces for moving and seating it against the other of said faces previous to the engagement of the article with said element, means for moving said element in a path approximately perpendicular to the path of movement of an article across said support, and means engaging a portion of said element to deflect it into the path of the article while maintaining it perpendicular to the path of the article so that the article approaches said portion at an angle thereto.

4. In an apparatus for forming articles by abrasion, a sanding belt, a stationary support upon which an article rests, an article carrying member reciprocable upon said support for feeding an article across said support transversely of said belt, said member having angularly arranged faces for engaging and seating similarly arranged faces of an article placed on said support, means for driving and supporting said belt, means for guiding a run of said belt in a path approximately perpendicular to the direction of article feed across said support into engagement with said belt, a bowed backing plate for transversely shaping a portion of the moving belt engaged by the article to abrade the same, and a yieldable member carried on said reciprocable member for maintaining the article seated thereon and against said support.

5. In an apparatus for forming articles by abrasion, article abrading means comprising a belt having an abrasive surface, reciprocatory means for feeding articles past said abrading means, reciprocatory means for receiving abraded articles, means actuated by said reciprocatory article feeding means for driving said reciprocatory article receiving means at a lower rate of speed than the speed of said reciprocatory article feeding means, and means for limiting the reverse movement of articles on said reciprocatory article receiving means when said latter means is reciprocated in a reverse direction.

6. In an apparatus for forming articles by abrasion, article abrading means comprising a belt having an abrasive surface, reciprocatory means for feeding articles past said abrading means, reciprocatory means for receiving abraded articles, a link and lever mechanism actuated by said reciprocatory article feeding means for driving said reciprocatory article receiving means at a lower rate of speed than the speed of said reciprocatory article feeding means, and means for limiting the reverse movement of articles on said reciprocatory article receiving means when said latter means is reciprocated in a reverse direction.

CHARLES O. BLAISDELL.

REFERENCES CITED

The following references are of record in the file of this patent:

UNITED STATES PATENTS

| Number | Name | Date |
|---|---|---|
| 258,553 | Brown et al. | May 30, 1882 |
| 325,258 | Margedant | Sept. 1, 1885 |
| 890,542 | Walker | June 9, 1908 |
| 947,491 | Bein | Jan. 25, 1910 |
| 1,025,836 | Schimmel | May 7, 1912 |
| 1,042,354 | Kroeze | Oct. 22, 1912 |
| 1,173,173 | Coleman | Feb. 29, 1916 |
| 1,415,785 | Brown | May 9, 1922 |
| 1,820,377 | Curtis | Aug. 25, 1931 |
| 1,841,411 | Kux | Jan. 19, 1932 |
| 2,354,970 | Volkel | Aug. 1, 1944 |
| 2,420,606 | McLeod | May 13, 1947 |
| 2,429,893 | Parks | Oct. 28, 1947 |

FOREIGN PATENTS

| Number | Country | Date |
|---|---|---|
| 248,918 | Italy | June 22, 1926 |
| 475,695 | Great Britain | Nov. 24, 1937 |
| 604,890 | Germany | Oct. 31, 1934 |